United States Patent
Min (10) Patent No.: US 10,420,172 B2
(45) Date of Patent: Sep. 17, 2019

(54) RRU CHANNEL FREQUENCY RESPONSE DIFFERENCE OBTAINING METHOD AND SYSTEM, AND BASE STATION DEVICE

(71) Applicant: HUAWEI TECHNOLOGIES CO., LTD., Shenzhen (CN)

(72) Inventor: Jian Min, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/013,964

(22) Filed: Jun. 21, 2018

(65) Prior Publication Data
US 2018/0302950 A1     Oct. 18, 2018

Related U.S. Application Data

(63) Continuation of application No. PCT/CN2015/098040, filed on Dec. 21, 2015.

(51) Int. Cl.
*H04W 72/04*     (2009.01)
*H04W 88/08*     (2009.01)
(Continued)

(52) U.S. Cl.
CPC .......... *H04W 88/085* (2013.01); *H04B 17/14* (2015.01); *H04B 17/21* (2015.01);
(Continued)

(58) Field of Classification Search
CPC ............... H04W 88/085; H04W 24/08; H04W 72/0453; H04W 16/14; H04W 72/04; H04W 88/08; H04L 5/0007
See application file for complete search history.

(56) References Cited

U.S. PATENT DOCUMENTS

2004/0004943 A1   1/2004   Kim et al.
2013/0070635 A1*  3/2013   Suo ................... H04W 52/0206
                                              370/252
(Continued)

FOREIGN PATENT DOCUMENTS

CN     102891708 A     1/2013
CN     103001686 A     3/2013
(Continued)

*Primary Examiner* — Chi Ho A Lee
(74) *Attorney, Agent, or Firm* — Kilpatrick Townsend & Stockton, LLP (57) ABSTRACT

An RRU channel frequency response difference obtaining method, device, and system are provided. In the method, multiple RRU channel groups are obtained between a BBU and an RRU, and all RRU channels in each RRU channel group are interconnected by using a same bridge. The method includes: separately obtaining, for a first RRU channel and a second RRU channel that are interconnected in any RRU channel group, a first frequency response difference between the first RRU channel and a separate RRU channel and a second frequency response difference between the second RRU channel and the separate RRU channel, where the separate RRU channel is not in the any RRU channel group; and obtaining a frequency response difference between the first RRU channel and the second RRU channel according to the first frequency response difference and the second frequency response difference.

10 Claims, 4 Drawing Sheets

Separately obtain, for a first RRU channel and a second RRU channel that are interconnected in any RRU channel group, a frequency response difference between the first RRU channel and a separate RRU channel and a frequency response difference between the second RRU channel and the separate RRU channel, where the separate RRU channel is not in the any RRU channel group  — 201

Obtain a frequency response difference between the first RRU channel and the second RRU channel according to the frequency response difference between the first RRU channel and the separate RRU channel and the frequency response difference between the second RRU channel and the separate RRU channel — 202

(51) Int. Cl.
H04W 16/14 (2009.01)
H04W 24/08 (2009.01)
H04L 25/02 (2006.01)
H04B 17/14 (2015.01)
H04B 17/21 (2015.01)
H04L 5/00 (2006.01)

(52) U.S. Cl.
CPC ........ H04L 25/022 (2013.01); H04L 25/0204 (2013.01); H04L 25/0224 (2013.01); H04W 16/14 (2013.01); H04W 24/08 (2013.01); H04W 72/0453 (2013.01); H04L 5/0007 (2013.01)

(56) References Cited

U.S. PATENT DOCUMENTS

| | | | |
|---|---|---|---|
| 2014/0198831 A1* | 7/2014 | Ou | H04B 1/0475 375/219 |
| 2014/0269318 A1* | 9/2014 | Hasarchi | H04B 7/024 370/235 |
| 2014/0373823 A1* | 12/2014 | Stevens | F41B 11/51 124/56 |
| 2015/0189669 A1 | 7/2015 | Huang et al. | |
| 2015/0365934 A1* | 12/2015 | Liu | H04L 5/0039 370/329 |
| 2016/0105251 A1* | 4/2016 | Cheng | H04B 10/25759 398/68 |
| 2016/0227396 A1* | 8/2016 | Lee | H04W 76/30 |
| 2016/0315674 A1* | 10/2016 | Li | H04B 7/0413 |
| 2017/0078024 A1* | 3/2017 | Liu | H04B 10/25759 |
| 2017/0188314 A1* | 6/2017 | Mueck | H04W 52/243 |
| 2018/0049041 A1* | 2/2018 | Puleri | H04B 7/022 |

FOREIGN PATENT DOCUMENTS

| | | |
|---|---|---|
| CN | 103428825 A | 12/2013 |
| CN | 103595665 A | 2/2014 |
| CN | 104378775 A | 2/2015 |
| EP | 3029900 B1 | 8/2018 |
| WO | 2015027675 A1 | 3/2015 |

* cited by examiner

RRU CHANNEL FREQUENCY RESPONSE DIFFERENCE OBTAINING METHOD AND SYSTEM, AND BASE STATION DEVICE

CROSS-REFERENCE TO RELATED APPLICATIONS

This application is a continuation of International Application No. PCT/CN2015/098040, filed on Dec. 21, 2015, the disclosure of which is hereby incorporated by reference in its entirety.

TECHNICAL FIELD

The present application relates to the field of communications technologies, and in particular, to an RRU channel frequency response difference obtaining method and system, and a base station device.

BACKGROUND

Currently, in a networking manner of a baseband unit (BBU) and a radio remote unit (RRU), one BBU can support multiple RRUs, and the BBU can be communicatively connected to each RRU by using multiple channels (also referred to as RRU channels). In actual application, to better improve quality of communication between a BBU and an RRU, a frequency response difference between RRU channels is often obtained. However, it is found in practice that, RRU channels may be interconnected by using a bridge (also referred to as an association processing network) due to some technology requirements. Therefore, an output signal of interconnected RRU channels is a mixed signal. Consequently, it is difficult to accurately obtain a frequency response difference between the interconnected RRU channels.

SUMMARY

Embodiments of the present application disclose an RRU channel frequency response difference obtaining method and system and a base station device, so that a frequency response difference between interconnected RRU channels can be accurately obtained.

A first aspect of the embodiments of the present application discloses an RRU channel frequency response difference obtaining method, where multiple RRU channel groups are obtained by means of division between a BBU and an RRU, all RRU channels in each RRU channel group are interconnected by using a same bridge, and the method includes:

separately obtaining, for a first RRU channel and a second RRU channel that are interconnected in any RRU channel group, a frequency response difference between the first RRU channel and a separate RRU channel and a frequency response difference between the second RRU channel and the separate RRU channel, where the separate RRU channel is not in the any RRU channel group; and obtaining a frequency response difference between the first RRU channel and the second RRU channel according to the frequency response difference between the first RRU channel and the separate RRU channel and the frequency response difference between the second RRU channel and the separate RRU channel.

In a first possible implementation of the first aspect of the embodiments of the present application, the separately obtaining, for a first RRU channel and a second RRU channel that are interconnected in any RRU channel group, a frequency response difference between the first RRU channel and a separate RRU channel and a frequency response difference between the second RRU channel and the separate RRU channel includes:

performing signal coupling on ends of the first RRU channel and the second RRU channel for the first RRU channel and the second RRU channel that are interconnected in the any RRU channel group, to obtain a first coupling signal, and performing signal coupling on an end of the separate RRU channel, to obtain a second coupling signal;

combining the first coupling signal and the second coupling signal to obtain a combined signal;

collecting the combined signal to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end, where the first calibration signal, the second calibration signal, and the third calibration signal are known calibration signals that are pairwise orthogonal or unrelated;

comparing the first component signal with the first calibration signal to obtain a first frequency response, comparing the second component signal with the second calibration signal to obtain a second frequency response, and comparing the third component signal with the third calibration signal to obtain a third frequency response; and obtaining a difference between the first frequency response and the third frequency response (for example, a ratio of the first frequency response to the third frequency response is used as the difference between the first frequency response and the third frequency response), and using the difference as the frequency response difference between the first RRU channel and the separate RRU channel; and obtaining a difference between the second frequency response and the third frequency response, and using the difference as the frequency response difference between the second RRU channel and the separate RRU channel.

Implementing the foregoing first possible implementation of the first aspect can reduce a design requirement for an RRU channel because a requirement for consistency between transmission frequency responses of all coupling signals can be saved. A longer transmission path of a coupling signal leads to greater difficulty in ensuring stability of a frequency response difference of paths during designing, and therefore the design requirement for an RRU channel is greatly reduced in this implementation.

With reference to the first possible implementation of the first aspect of the embodiments of the present application, in a second possible implementation of the first aspect of the embodiments of the present application, the combining the first coupling signal and the second coupling signal to obtain a combined signal includes:

processing the first coupling signal by using a first transmission frequency response of the first coupling signal, and processing the second coupling signal by using a second transmission frequency response of the second coupling signal; and combining the processed first coupling signal and the processed second coupling signal to obtain the combined signal.

With reference to the second possible implementation of the first aspect of the embodiments of the present application, in a third possible implementation of the first aspect of the embodiments of the present application, the collecting the combined signal to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end includes:

processing the combined signal by using a third transmission frequency response of the combined signal; and collecting the processed combined signal to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel, where the first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

With reference to the third possible implementation of the first aspect of the embodiments of the present application, in a fourth possible implementation of the first aspect of the embodiments of the present application, the comparing the first component signal with the first calibration signal to obtain a first frequency response includes:

dividing the first component signal by the first calibration signal to obtain a product of the frequency response of the first RRU channel, the first transmission frequency response, and the third transmission frequency response, and using the product as the first frequency response;

the comparing the second component signal with the second calibration signal to obtain a second frequency response includes:

dividing the second component signal by the second calibration signal to obtain a product of the frequency response of the second RRU channel, the first transmission frequency response, and the third transmission frequency response, and using the product as the second frequency response;

the comparing the third component signal with the third calibration signal to obtain a third frequency response includes:

dividing the third component signal by the third calibration signal to obtain a product of the frequency response of the separate RRU channel, the second transmission frequency response, and the third transmission frequency response, and using the product as the third frequency response; and the obtaining a frequency response difference between the first RRU channel and the second RRU channel according to the frequency response difference between the first RRU channel and the separate RRU channel and the frequency response difference between the second RRU channel and the separate RRU channel includes:

dividing the frequency response difference between the first RRU channel and the separate RRU channel by the frequency response difference between the second RRU channel and the separate RRU channel, to obtain the frequency response difference between the first RRU channel and the second RRU channel.

A second aspect of the embodiments of the present application discloses an RRU channel frequency response difference obtaining system, where multiple RRU channel groups are obtained by means of division between a BBU and an RRU, all RRU channels in each RRU channel group are interconnected by using a same bridge, and the system includes:

a first obtaining unit, configured to separately obtain, for a first RRU channel and a second RRU channel that are interconnected in any RRU channel group, a frequency response difference between the first RRU channel and a separate RRU channel and a frequency response difference between the second RRU channel and the separate RRU channel, where the separate RRU channel is not in the any RRU channel group; and a second obtaining unit, configured to obtain a frequency response difference between the first RRU channel and the second RRU channel according to the frequency response difference between the first RRU channel and the separate RRU channel and the frequency response difference between the second RRU channel and the separate RRU channel.

In a first possible implementation of the second aspect of the embodiments of the present application, the first obtaining unit includes:

a first coupling subunit, configured to perform signal coupling on ends of the first RRU channel and the second RRU channel for the first RRU channel and the second RRU channel that are interconnected in the any RRU channel group, to obtain a first coupling signal;

a second coupling subunit, configured to perform signal coupling on an end of the separate RRU channel, to obtain a second coupling signal;

a combiner subunit, configured to combine the first coupling signal and the second coupling signal to obtain a combined signal;

a collection subunit, configured to collect the combined signal to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end, where the first calibration signal, the second calibration signal, and the third calibration signal are known calibration signals that are pairwise orthogonal or unrelated;

a comparison subunit, configured to: compare the first component signal with the first calibration signal to obtain a first frequency response, compare the second component signal with the second calibration signal to obtain a second frequency response, and compare the third component signal with the third calibration signal to obtain a third frequency response; and an obtaining subunit, configured to: obtain a difference between the first frequency response and the third frequency response, and use the difference as the frequency response difference between the first RRU channel and the separate RRU channel; and obtain a difference between the second frequency response and the third frequency response, and use the difference as the frequency response difference between the second RRU channel and the separate RRU channel.

Implementing the foregoing first possible implementation of the second aspect can reduce a design requirement for an RRU channel because a requirement for consistency between transmission frequency responses of all coupling signals can be saved. A longer transmission path of a coupling signal leads to greater difficulty in ensuring stability of a frequency response difference of paths during designing, and therefore the design requirement for an RRU channel is greatly reduced in this implementation.

With reference to the first possible implementation of the second aspect of embodiments of the present application, in a second possible implementation of the second aspect of the embodiments of the present application, the combiner subunit is configured to: process the first coupling signal by using a first transmission frequency response of the first coupling signal, process the second coupling signal by using a second transmission frequency response of the second coupling signal, and combine the processed first coupling signal and the processed second coupling signal to obtain the combined signal.

With reference to the second possible implementation of the second aspect of the embodiments of the present application, in a third possible implementation of the second aspect of the embodiments of the present application, the collection subunit is configured to: process the combined signal by using a third transmission frequency response of the combined signal; and collect the processed combined signal to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel, where the first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

With reference to the third possible implementation of the second aspect of the embodiments of the present application, in a fourth possible implementation of the second aspect of the embodiments of the present application, the comparison subunit is configured to: divide the first component signal by the first calibration signal to obtain a product of the frequency response of the first RRU channel, the first transmission frequency response, and the third transmission frequency response, and use the product as the first frequency response; divide the second component signal by the second calibration signal to obtain a product of the frequency response of the second RRU channel, the first transmission frequency response, and the third transmission frequency response, and use the product as the second frequency response; and divide the third component signal by the third calibration signal to obtain a product of the frequency response of the separate RRU channel, the second transmission frequency response, and the third transmission frequency response, and use the product as the third frequency response; and the second obtaining unit is configured to divide the frequency response difference between the first RRU channel and the separate RRU channel by the frequency response difference between the second RRU channel and the separate RRU channel, to obtain the frequency response difference between the first RRU channel and the second RRU channel.

A third aspect of the embodiments of the present application discloses a base station device, where multiple RRU channel groups are obtained by means of division between a BBU and an RRU, all RRU channels in each RRU channel group are interconnected by using a same bridge, and the base station device includes a circuit board, a processor, and a memory, where the processor and the memory are carried on the circuit board, and the processor is configured to invoke program code stored in the memory, to perform the following operations:

separately obtaining, for a first RRU channel and a second RRU channel that are interconnected in any RRU channel group, a frequency response difference between the first RRU channel and a separate RRU channel and a frequency response difference between the second RRU channel and the separate RRU channel, where the separate RRU channel does not pass through a bridge through which both the first RRU channel and the second RRU channel pass; and obtaining a frequency response difference between the first RRU channel and the second RRU channel according to the frequency response difference between the first RRU channel and the separate RRU channel and the frequency response difference between the second RRU channel and the separate RRU channel.

In a first possible implementation of the third aspect of the embodiments of the present application, the base station device further includes a first coupler, a second coupler, and a combiner that are carried on the circuit board, where the first coupler and the second coupler are separately electrically connected to the combiner, the combiner is electrically connected to the processor, and a manner in which the processor separately obtains, for the first RRU channel and the second RRU channel that are interconnected in the any RRU channel group, the frequency response difference between the first RRU channel and the separate RRU channel and the frequency response difference between the second RRU channel and the separate RRU channel is specifically:

the processor triggers, for the first RRU channel and the second RRU channel that are interconnected in the any RRU channel group, the first coupler to perform signal coupling on ends of the first RRU channel and the second RRU channel, to obtain a first coupling signal and transmit the first coupling signal to the combiner; and triggers the second coupler to perform signal coupling on an end of the separate RRU channel, to obtain a second coupling signal and transmit the second coupling signal to the combiner; and the combiner combines the first coupling signal and the second coupling signal, to obtain a combined signal and transmit the combined signal to the processor;

the processor collects the combined signal to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end, where the first calibration signal, the second calibration signal, and the third calibration signal are known calibration signals that are pairwise orthogonal or unrelated;

the processor compares the first component signal with the first calibration signal to obtain a first frequency response, compares the second component signal with the second calibration signal to obtain a second frequency response, and compares the third component signal with the third calibration signal to obtain a third frequency response; and the processor obtains a difference between the first frequency response and the third frequency response (for example, a ratio of the first frequency response to the third frequency response may be used as the difference between the first frequency response and the third frequency response) and uses the difference as the frequency response difference between the first RRU channel and the separate RRU channel, and obtains a difference between the second frequency response and the third frequency response and uses the difference as the frequency response difference between the second RRU channel and the separate RRU channel.

Implementing the foregoing first possible implementation of the third aspect can reduce a design requirement for an RRU channel because a requirement for consistency between transmission frequency responses of all coupling signals can be saved. A longer transmission path of a coupling signal leads to greater difficulty in ensuring stability of a frequency response difference of paths during designing, and therefore the design requirement for an RRU channel is greatly reduced in this implementation.

With reference to the first possible implementation of the third aspect of the embodiments of the present application, in a second possible implementation of the third aspect of the embodiments of the present application, a manner in which the combiner combines the first coupling signal and the second coupling signal to obtain the combined signal is specifically:

the combiner processes the first coupling signal by using a first transmission frequency response of the first coupling signal, the combiner processes the second coupling signal by using a second transmission frequency response of the second coupling signal, and the combiner combines the processed first coupling signal and the processed second coupling signal to obtain the combined signal.

With reference to the second possible implementation of the third aspect of the embodiments of the present application, in a third possible implementation of the third aspect of the embodiments of the present application, a manner in which the processor collects the combined signal to obtain the first component signal that is of the first calibration signal input from the first RRU channel and that is output from the end, the second component signal that is of the second calibration signal input from the second RRU channel and that is output from the end, and the third component signal that is of the third calibration signal input from the separate RRU channel and that is output from the end is specifically:

the processor processes the combined signal by using a third transmission frequency response of the combined signal; and the processor collects the processed combined signal to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel, where the first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

With reference to the third possible implementation of the third aspect of the embodiments of the present application, in a fourth possible implementation of the third aspect of the embodiments of the present application, a manner in which the processor compares the first component signal with the first calibration signal to obtain the first frequency response is specifically:

dividing the first component signal by the first calibration signal to obtain a product of the frequency response of the first RRU channel, the first transmission frequency response, and the third transmission frequency response, and using the product as the first frequency response;

a manner in which the processor compares the second component signal with the second calibration signal to obtain the second frequency response is specifically:

dividing the second component signal by the second calibration signal to obtain a product of the frequency response of the second RRU channel, the first transmission frequency response, and the third transmission frequency response, and using the product as the second frequency response;

a manner in which the processor compares the third component signal with the third calibration signal to obtain the third frequency response is specifically:

dividing, by the processor, the third component signal by the third calibration signal to obtain a product of the frequency response of the separate RRU channel, the second transmission frequency response, and the third transmission frequency response, and using the product as the third frequency response; and that the processor obtains a frequency response difference between the first RRU channel and the second RRU channel according to the frequency response difference between the first RRU channel and the separate RRU channel and the frequency response difference between the second RRU channel and the separate RRU channel includes:

the processor divides the frequency response difference between the first RRU channel and the separate RRU channel by the frequency response difference between the second RRU channel and the separate RRU channel, to obtain the frequency response difference between the first RRU channel and the second RRU channel.

In the embodiments of the present application, because all RRU channels in each RRU channel group between a BBU and an RRU are interconnected by using a same bridge (also referred to as an association processing network), when the frequency response difference between the first RRU channel and the second RRU channel that are interconnected in the any RRU channel group is obtained, the separate RRU channel that is not in the any RRU channel group may be introduced, the frequency response difference between the first RRU channel and the separate RRU channel and the frequency response difference between the second RRU channel and the separate RRU channel are separately obtained, and the frequency response difference between the first RRU channel and the second RRU channel is obtained according to the frequency response difference between the first RRU channel and the separate RRU channel and the frequency response difference between the second RRU channel and the separate RRU channel. On the basis of obtaining the frequency response difference between the first RRU channel and the separate RRU channel and the frequency response difference between the second RRU channel and the separate RRU channel, an operation may be performed on the frequency response difference between the first RRU channel and the separate RRU channel and the frequency response difference between the second RRU channel and the separate RRU channel, to counteract impact exerted on a frequency response difference by interconnection between the first RRU channel and the second RRU channel, so that the frequency response difference between the interconnected RRU channels can be accurately obtained.

BRIEF DESCRIPTION OF DRAWINGS

To describe the technical solutions in the embodiments of the present application more clearly, the following briefly describes the accompanying drawings wanted for describing the embodiments. Apparently, the accompanying drawings in the following description show merely some embodiments of the present application, and persons of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
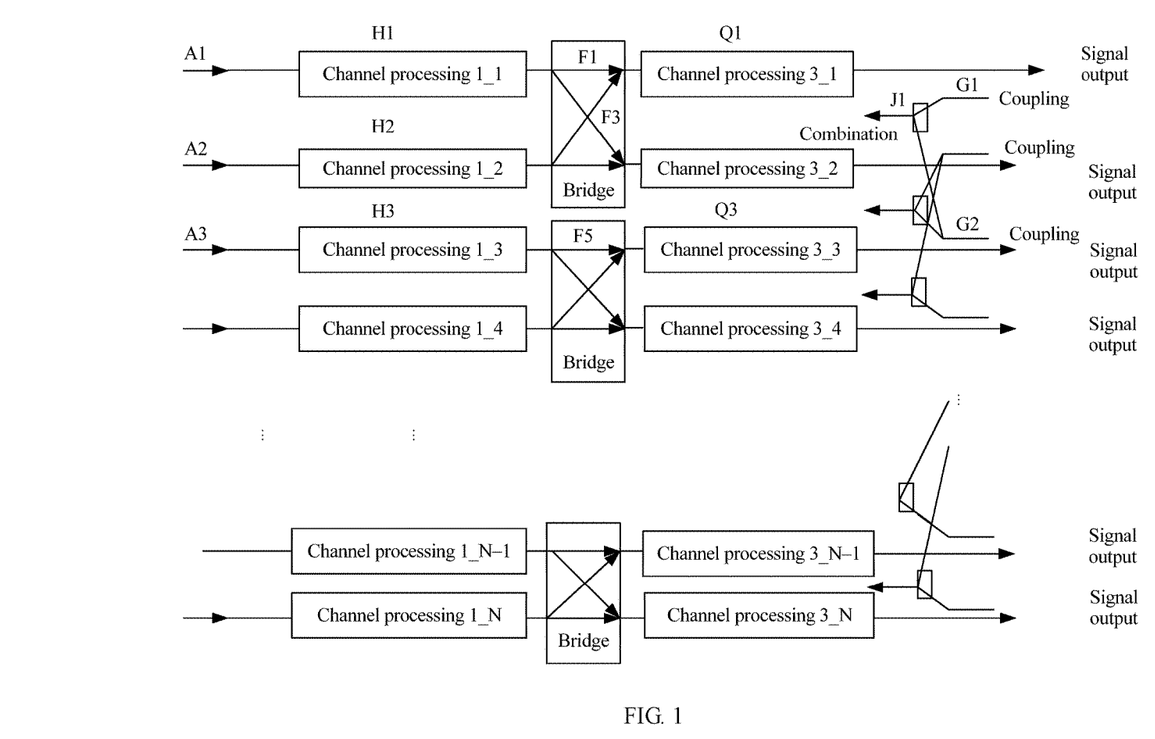
FIG. 1 is a schematic diagram of an RRU channel network architecture disclosed in an embodiment of the present invention.

For better understanding of the embodiments of the present application, an RRU channel network architecture disclosed in the embodiments of the present application is first described below. Referring to FIG. 1, FIG. 1 shows an RRU channel network architecture disclosed in an embodiment of the present invention. As shown in FIG. 1, the RRU channel network architecture disclosed in the embodiments of the present application may include multiple RRU channels, and some RRU channels are interconnected by using an association processing network (also referred to as a bridge). For example, an RRU channel 1_1/an RRU channel 3_1 and an RRU channel 1_2/an RRU channel 3_1 are interconnected by using a bridge 1, and the RRU channel 1_1/an RRU channel 3_2 and the RRU channel 1_2/the RRU channel 3_2 are also interconnected by using the bridge 1. In this case, output signals of ends (same ends) of the RRU channel 1_1/the RRU channel 3_1 and the RRU channel 1_2/the RRU channel 3_1 and output signals of ends of the RRU channel 1_1/the RRU channel 3_2 and the RRU channel 1_2/the RRU channel 3_2 are mixed signals, and therefore it is difficult to accurately obtain a frequency response difference between the RRU channel 1_1/the RRU channel 3_1 and the RRU channel 1_2/the RRU channel 3_1 that are interconnected and a frequency response difference between the RRU channel 1_1/the RRU channel 3_2 and the RRU channel 1_2/the RRU channel 3_2 that are interconnected. For this disadvantage, the embodiments of the present application disclose an RRU channel frequency response difference obtaining method and system and a base station device, so that a frequency response difference between interconnected RRU channels can be accurately obtained. Details are separately described below.

Figure 2:
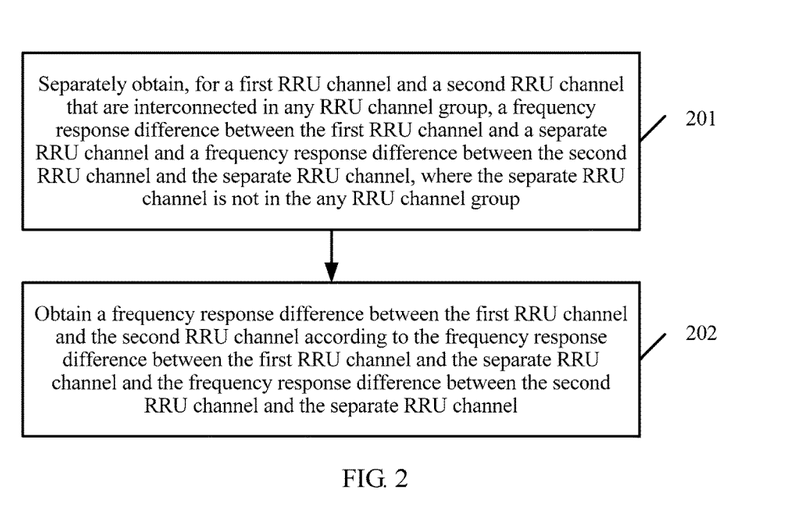
FIG. 2 is a schematic flowchart of an RRU channel frequency response difference obtaining method disclosed in an embodiment of the present invention.

Referring to FIG. 2, FIG. 2 is a schematic flowchart of an RRU channel frequency response difference obtaining method disclosed in an embodiment of the present invention. In the method shown in FIG. 2, multiple RRU channel groups may be obtained by means of division between a BBU and an RRU, and all RRU channels in each RRU channel group are interconnected by using a same bridge. For example, FIG. 1 is used as an example. Because an RRU channel 1_1/an RRU channel 3_1 and an RRU channel 1_2/an RRU channel 3_1 are interconnected by using a bridge 1, the RRU channel 1_1/the RRU channel 3_1 and the RRU channel 1_2/the RRU channel 3_1 can be classified as one RRU channel group. In the method described in FIG. 2, the RRU channel 1_1/the RRU channel 3_1 is used as a first RRU channel and the RRU channel 1_2/the RRU channel 3_1 is used as a second RRU channel for description. As shown in FIG. 2, the method may include the following steps.

201. Separately obtain, for a first RRU channel and a second RRU channel that are interconnected in any RRU channel group, a frequency response difference between the first RRU channel and a separate RRU channel and a frequency response difference between the second RRU channel and the separate RRU channel, where the separate RRU channel is not in the any RRU channel group.

The RRU channel network architecture shown in FIG. 1 is used as an example. In this embodiment of the present invention, for the first RRU channel and the second RRU channel that are interconnected in the any RRU channel group, the RRU channel 1_3/the RRU channel 3_3 may be selected as the separate RRU channel, and the separate RRU channel is not in the RRU channel group in which the first RRU channel and the second RRU channel are located.

202. Obtain a frequency response difference between the first RRU channel and the second RRU channel according to the frequency response difference between the first RRU channel and the separate RRU channel and the frequency response difference between the second RRU channel and the separate RRU channel.

In some embodiments, in the foregoing step 201, a manner for separately obtaining, for the first RRU channel and the second RRU channel that are interconnected in the any RRU channel group, the frequency response difference between the first RRU channel and the separate RRU channel and the frequency response difference between the second RRU channel and the separate RRU channel may be as follows:

Signal coupling is performed on ends of the first RRU channel and the second RRU channel for the first RRU channel and the second RRU channel that are interconnected in the any RRU channel group, to obtain a first coupling signal. Signal coupling is performed on an end of the separate RRU channel, to obtain a second coupling signal. The first coupling signal and the second coupling signal are combined, to obtain a combined signal. The combined signal is collected to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end. The first calibration signal, the second calibration signal, and the third calibration signal are known calibration signals that are pairwise orthogonal or unrelated. The first component signal is compared with the first calibration signal to obtain a first frequency response, the second component signal is compared with the second calibration signal to obtain a second frequency response, and the third component signal is compared with the third calibration signal to obtain a third frequency response. A difference between the first frequency response and the third frequency response is obtained and used as the frequency response difference between the first RRU channel and the separate RRU channel. A difference between the second frequency response and the third frequency response is obtained and used as the frequency response difference between the second RRU channel and the separate RRU channel. Implementing the foregoing manner can reduce a design requirement for an RRU channel because a requirement for consistency between transmission frequency responses of all coupling signals can be saved. A longer transmission path of a coupling signal leads to greater difficulty in ensuring stability of a frequency response difference of paths during designing, and therefore the design requirement for an RRU channel is greatly reduced in this implementation.

In some embodiments, that the first coupling signal and the second coupling signal are combined to obtain a combined signal may be as follows:

The first coupling signal is processed by using a first transmission frequency response of the first coupling signal, the second coupling signal is processed by using a second transmission frequency response of the second coupling signal, and the processed first coupling signal and the processed second coupling signal are combined to obtain the combined signal.

In some embodiments, that the combined signal is collected to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end may be as follows:

The combined signal is processed by using a third transmission frequency response of the combined signal, and the processed combined signal is collected to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel. The first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

The RRU channel network architecture shown in FIG. 1 is used as an example. It is assumed that the first calibration signal input from the first RRU channel is A1, the second calibration signal input from the second RRU channel is A2, and the third calibration signal input from the separate RRU channel is A3. A1, A2, and A3 are known calibration signals that are pairwise orthogonal or unrelated, or A1, A2, and A3 may be same calibration signals in time division inputting. This is not limited in this embodiment of the present invention. In addition, it is further assumed that the frequency response of the first RRU channel is H1×F1×Q1, the frequency response of the second RRU channel is H2×F3×Q1, and the frequency response of the separate RRU channel is H3×F5×Q3. H1, H2, H3, F1, F3, F5, Q1, and Q3 are all unknown. Therefore, correspondingly, the first coupling signal A1×H1×F1×Q1+A2×H2×F3×Q1 may be obtained by performing signal coupling on the ends of the first RRU channel and the second RRU channel, and the second coupling signal A3×H3×F5×Q3 may be obtained by performing signal coupling on the end of the separate RRU channel. Further, when the first coupling signal A1×H1×F1×Q1+A2×H2×F3×Q1 and the second coupling signal A3×H3×F5×Q3 are combined, the first coupling signal A1×H1×F1×Q1+A2×H2×F3×Q1 may be processed by using the first transmission frequency response G1 of the first coupling signal A1×H1×F1×Q1+A2×H2×F3×Q1, that is, (A1×H1×F1×Q1+A2×H2×F3×Q1)×G1; and the second coupling signal A3×H3×F5×Q3 is processed by using the second transmission frequency response G2 of the second coupling signal A3×H3×F5×Q3, that is, (A3×H3×F5×Q3)×G2. In addition, the processed first coupling signal (A1×H1×F1×Q1+A2×H2×F3×Q1)×G1 and the processed second coupling signal (A3×H3×F5×Q3)×G2 are combined, to obtain the combined signal A1×H1×F1×Q1×G1+A2×H2×F3×Q1×G1+A3×H3×F5×Q3×G2.

Further, in a process of collecting the combined signal A1×H1×F1×Q1×G1+A2×H2×F3×Q1×G1+A3×H3×F5×Q3×G2 to obtain the first component signal that is of the first calibration signal A1 input from the first RRU channel and that is output from the end, the second component signal that is of the second calibration signal A2 input from the second RRU channel and that is output from the end, and the third component signal that is of the third calibration signal A3 input from the separate RRU channel and that is output from the end, the combined signal A1×H1×F1×Q1×G1+A2×H2×F3×Q1×G1+A3×H3×F5×Q3×G2 may be processed by using the third transmission frequency response J1 of the combined signal A1×H1×F1×Q1×G1+A2×H2×F3×Q1×G1+A3×H3×F5×Q3×G2 (that is, (A1×H1×F1×Q1×G1+A2×H2×F3×Q1×G1+A3×H3×F5×Q3×G2)×J1), and the processed combined signal is collected to obtain the first component signal A1×H1×F1×Q1×G1×J1 corresponding to the first calibration signal A1 on the end that is input from the first RRU channel, the second component signal A2×H2×F3×Q1×G1×J1 corresponding to the second calibration signal A2 on the end that is input from the second RRU channel, and the third component signal A3×H3×F5×

Q3×G2×J1 corresponding to the third calibration signal A3 on the end that is input from the separate RRU channel. It can be learned that, the first component signal A1×H1×F1×Q1×G1×J1 is the product of the first calibration signal A1, the frequency response H1×F1×Q1 of the first RRU channel, the first transmission frequency response G1, and the third transmission frequency response J1, the second component signal A2×H2×F3×Q1×G1×J1 is the product of the second calibration signal A2, the frequency response H2×F3×Q1 of the second RRU channel, the first transmission frequency response G1, and the third transmission frequency response J1, and the third component signal A3×H3×F5×Q3×G2×J1 is the product of the third calibration signal A3, the frequency response H3×F5×Q3 of the separate RRU channel, the second transmission frequency response G2, and the third transmission frequency response J1.

Further, in a process of comparing the first component signal with the first calibration signal, an operation may be performed on the first component signal A1×H1×F1×Q1×G1×J1 and the first calibration signal A1 (for example, the first component signal A1×H1×F1×Q1×G1×J1 is divided by the first calibration signal A1), to obtain a product of the frequency response H1×F1×Q1 of the first RRU channel, the first transmission frequency response G1, and the third transmission frequency response J1, and the product is used as the first frequency response, that is, the first frequency response is H1×F1×Q1×G1×J1. In a process of comparing the second component signal with the second calibration signal, an operation may be performed on the second component signal A2×H2×F3×Q1×G1×J1 and the second calibration signal A2 (for example, the second component signal A2×H2×F3×Q1×G1×J1 is divided by the second calibration signal A2), to obtain a product of the frequency response H2×F3×Q1 of the second RRU channel, the first transmission frequency response G1, and the third transmission frequency response J1, and the product is used as the second frequency response, that is, the second frequency response is H2×F3×Q1×G1×J1. In a process of comparing the third component signal with the third calibration signal, an operation may be performed on the third component signal A3×H3×F5×Q3×G2×J1 and the third calibration signal A3 (for example, the third component signal A3×H3×F5×Q3×G2×J1 is divided by the third calibration signal A3), to obtain a product of the frequency response H3×F5×Q3 of the separate RRU channel, the second transmission frequency response G2, and the third transmission frequency response J1, and the product is used as the third frequency response, that is, the third frequency response is H3×F5×Q3×G2×J1.

Further, the difference (H1×F1×Q1×G1)/(H3×F5×Q3×G2) between the first frequency response H1×F1×Q1×G1×J1 and the third frequency response H3×F5×Q3×G2×J1 may be obtained and used as the frequency response difference between the first RRU channel and the separate RRU channel, and the difference (H2×F3×Q1×G1)/(H3×F5×Q3×G2) between the second frequency response H2×F3×Q1×G1×J1 and the third frequency response H3×F5×Q3×G2×J1 may be obtained and used as the frequency response difference between the second RRU channel and the separate RRU channel.

Further, in a process of obtaining the frequency response difference between the first RRU channel and the second RRU channel according to the frequency response difference between the first RRU channel and the separate RRU channel and the frequency response difference between the second RRU channel and the separate RRU channel, the frequency response difference (H1×F1×Q1×G1)/(H3×F5×Q3×G2) between the first RRU channel and the separate RRU channel may be divided by the frequency response difference (H2×F3×Q1×G1)/(H3×F5×Q3×G2) between the second RRU channel and the separate RRU channel to obtain the frequency response difference between the first RRU channel and the second RRU channel, that is, (H1×F1×Q1)/(H2×F3×Q1).

In this embodiment of the present invention, by performing the foregoing method described in FIG. 2, a frequency response difference between any two interconnected RRU channels in the RRU channel network architecture shown in FIG. 1 can be accurately obtained.

In the method described in FIG. 2, because all RRU channels in each RRU channel group are interconnected by using a same bridge (also referred to as an association processing network), when the frequency response difference between the first RRU channel and the second RRU channel that are interconnected in the any RRU channel group is obtained, the separate RRU channel that is not in the any RRU channel group may be introduced, the frequency response difference between the first RRU channel and the separate RRU channel and the frequency response difference between the second RRU channel and the separate RRU channel are separately obtained, and the frequency response difference between the first RRU channel and the second RRU channel is obtained according to the frequency response difference between the first RRU channel and the separate RRU channel and the frequency response difference between the second RRU channel and the separate RRU channel. On the basis of obtaining the frequency response difference between the first RRU channel and the separate RRU channel and the frequency response difference between the second RRU channel and the separate RRU channel, an operation may be performed on the frequency response difference between the first RRU channel and the separate RRU channel and the frequency response difference between the second RRU channel and the separate RRU channel, to counteract impact exerted on a frequency response difference by interconnection between the first RRU channel and the second RRU channel, so that the frequency response difference between the interconnected RRU channels can be accurately obtained.

Figure 3:
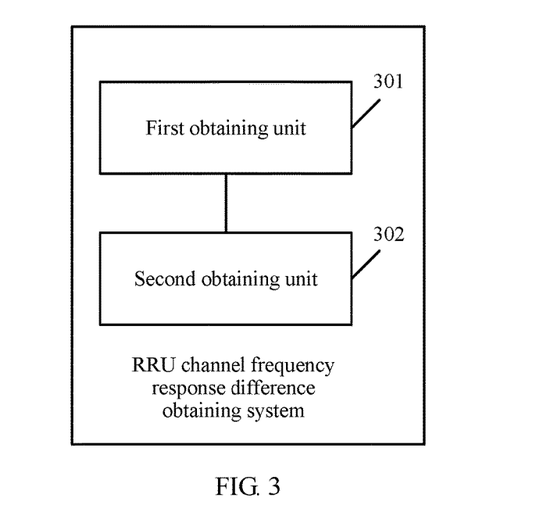
FIG. 3 is a schematic structural diagram of an RRU channel frequency response difference obtaining system disclosed in an embodiment of the present invention.

Referring to FIG. 3, FIG. 3 is a schematic structural diagram of an RRU channel frequency response difference obtaining system disclosed in an embodiment of the present invention. The RRU channel frequency response difference obtaining system shown in FIG. 3 may be applied to the RRU channel network architecture shown in FIG. 1. That is, multiple RRU channel groups may be obtained by means of division between a BBU and an RRU, and all RRU channels in each RRU channel group are interconnected by using a same bridge. As shown in FIG. 3, the system may include:

a first obtaining unit 301, configured to separately obtain, for a first RRU channel and a second RRU channel that are interconnected in any RRU channel group, a frequency response difference between the first RRU channel and a separate RRU channel and a frequency response difference between the second RRU channel and the separate RRU channel, where the separate RRU channel is not in the any RRU channel group; and a second obtaining unit 302, configured to obtain a frequency response difference between the first RRU channel and the second RRU channel according to the frequency response difference between the first RRU channel and the separate RRU channel and the frequency response difference between the second RRU channel and the separate RRU channel.

Figure 4:
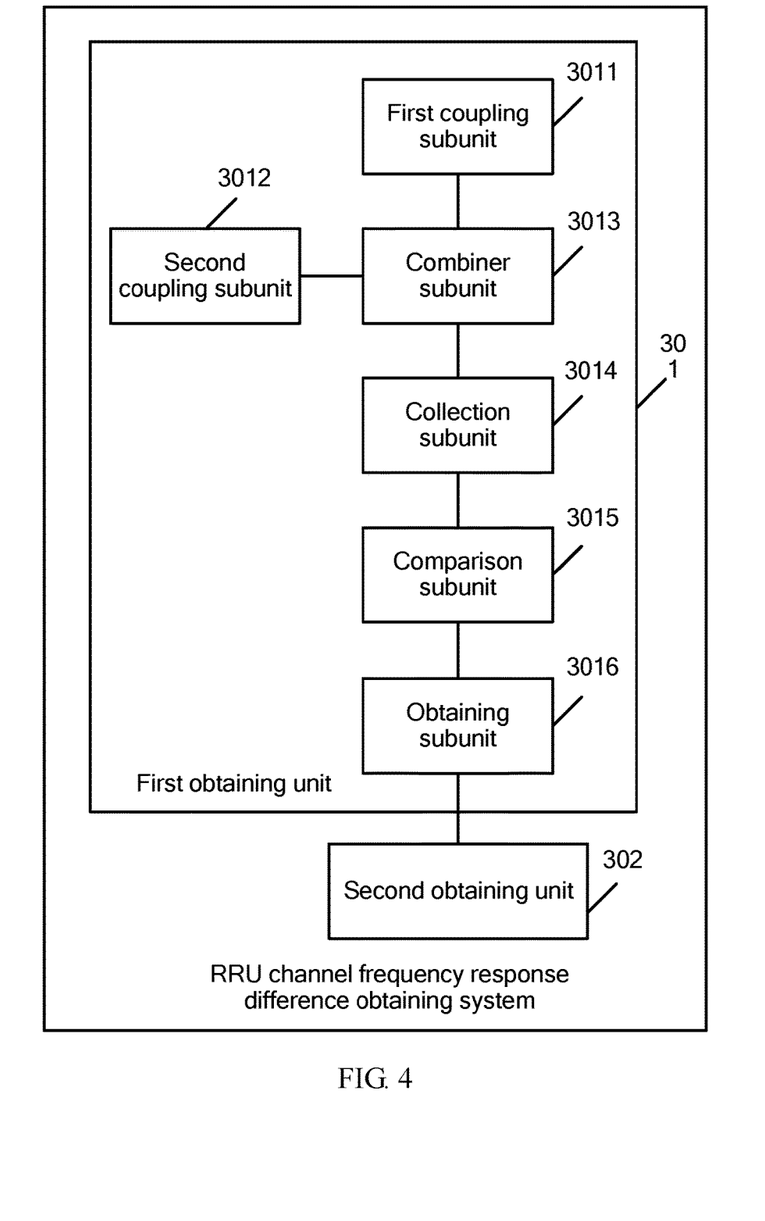
FIG. 4 is a schematic structural diagram of another RRU channel frequency response difference obtaining system disclosed in an embodiment of the present invention.

Referring to FIG. 4 at the same time, FIG. 4 is a schematic structural diagram of another RRU channel frequency response difference obtaining system disclosed in an embodiment of the present invention. The another RRU channel frequency response difference obtaining system described in FIG. 4 is obtained by optimizing the RRU channel frequency response difference obtaining system shown in FIG. 3. In the another RRU channel frequency response difference obtaining system described in FIG. 4, the first obtaining unit 301 includes:

a first coupling subunit 3011, configured to perform signal coupling on ends of the first RRU channel and the second RRU channel for the first RRU channel and the second RRU channel that are interconnected in the any RRU channel group, to obtain a first coupling signal;

a second coupling subunit 3012, configured to perform signal coupling on an end of the separate RRU channel, to obtain a second coupling signal;

a combiner subunit 3013, configured to combine the first coupling signal and the second coupling signal to obtain a combined signal;

a collection subunit 3014, configured to collect the combined signal to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end, where the first calibration signal, the second calibration signal, and the third calibration signal are known calibration signals that are pairwise orthogonal or unrelated;

a comparison subunit 3015, configured to: compare the first component signal with the first calibration signal to obtain a first frequency response, compare the second component signal with the second calibration signal to obtain a second frequency response, and compare the third component signal with the third calibration signal to obtain a third frequency response; and an obtaining subunit 3016, configured to: obtain a difference between the first frequency response and the third frequency response, and use the difference as the frequency response difference between the first RRU channel and the separate RRU channel; and obtain a difference between the second frequency response and the third frequency response, and use the difference as the frequency response difference between the second RRU channel and the separate RRU channel.

Implementing the first obtaining unit 301 described in FIG. 4 can reduce a design requirement for an RRU channel because a requirement for consistency between transmission frequency responses of all coupling signals can be saved. A transmission frequency response of each coupling signal changes with an environmental factor and is unstable, and therefore the design requirement for an RRU channel is greatly reduced in this implementation.

In some embodiments, the combiner subunit 3013 is configured to: process the first coupling signal by using a first transmission frequency response of the first coupling signal, process the second coupling signal by using a second transmission frequency response of the second coupling signal, and combine the processed first coupling signal and the processed second coupling signal to obtain the combined signal.

In some embodiments, the collection subunit 3014 is configured to: process the combined signal by using a third transmission frequency response of the combined signal; and collect the processed combined signal to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel, where the first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

In some embodiments, the comparison subunit 3015 is configured to: divide the first component signal by the first calibration signal, to obtain a product of the frequency response of the first RRU channel, the first transmission frequency response, and the third transmission frequency response, and use the product as the first frequency response; divide the second component signal by the second calibration signal, to obtain a product of the frequency response of the second RRU channel, the first transmission frequency response, and the third transmission frequency response, and use the product as the second frequency response; and divide the third component signal by the third calibration signal, to obtain a product of the frequency response of the separate RRU channel, the second transmission frequency response, and the third transmission frequency response, and use the product as the third frequency response.

In some embodiments, the second obtaining unit 302 is configured to divide the frequency response difference between the first RRU channel and the separate RRU channel by the frequency response difference between the second RRU channel and the separate RRU channel, to obtain the frequency response difference between the first RRU channel and the second RRU channel.

The RRU channel network architecture shown in FIG. 1 is used as an example. It is assumed that the first calibration signal input from the first RRU channel is A1, the second calibration signal input from the second RRU channel is A2, and the third calibration signal input from the separate RRU channel is A3. A1, A2, and A3 are known calibration signals that are pairwise orthogonal or unrelated, or A1, A2, and A3 may be same calibration signals in time division inputting. This is not limited in this embodiment of the present invention. In addition, it is further assumed that the frequency response of the first RRU channel is H1×F1×Q1, the frequency response of the second RRU channel is H2×F3×Q1, and the frequency response of the separate RRU channel is H3×F5×Q3. H1, H2, H3, F1, F3, F5, Q1, and Q3 are all unknown. Therefore, correspondingly, the first coupling subunit 3011 may obtain the first coupling signal A1×H1×F1×Q1+A2×H2×F3×Q1 by performing signal coupling on the ends of the first RRU channel and the second RRU channel, and the second coupling subunit 3012 may obtain the second coupling signal A3×H3×F5×Q3 by performing signal coupling on the end of the separate RRU channel. Further, when combining the first coupling signal A1×H1×F1×Q1+A2×H2×F3×Q1 and the second coupling signal A3×H3×F5×Q3, the combiner subunit 3013 may process the first coupling signal A1×H1×F1×Q1+A2×H2×F3×Q1 by using the first transmission frequency response G1 of the first coupling signal A1×H1×F1×Q1+A2×H2×F3×Q1, that is, (A1×H1×F1×Q1+A2×H2×F3×Q1)×G1, process the second coupling signal A3×H3×F5×Q3 by using the second transmission frequency response G2 of the second coupling signal A3×H3×F5×Q3, that is, (A3×H3×F5×Q3)×G2, and combine the processed first coupling signal (A1×H1×F1×Q1+A2×H2×F3×Q1)×G1 and the processed second coupling signal (A3×H3×F5×Q3)×G2, to obtain the combined signal A1×H1×F1×Q1×G1+A2×H2×F3×Q1×G1+A3×H3×F5×Q3×G2.

Further, in a process of collecting the combined signal A1×H1×F1×Q1×G1+A2×H2×F3×Q1×G1+A3×H3×F5×Q3×G2 to obtain the first component signal that is of the first calibration signal A1 input from the first RRU channel and that is output from the end, the second component signal that is of the second calibration signal A2 input from the second RRU channel and that is output from the end, and the third component signal that is of the third calibration signal A3 input from the separate RRU channel and that is output from the end, the collection subunit 3014 may process the combined signal A1×H1×F1×Q1×G1+A2×H2×F3×Q1×G1+A3×H3×F5×Q3×G2 by using the third transmission frequency response J1 of the combined signal A1×H1×F1×Q1×G1+A2×H2×F3×Q1×G1+A3×H3×F5×Q3×G2 (that is, (A1×H1×F1×Q1×G1+A2×H2×F3×Q1×G1+A3×H3×F5×Q3×G2)×J1), and collect the processed combined signal to obtain the first component signal A1×H1×F1×Q1×G1×J1 corresponding to the first calibration signal A1 on the end that is input from the first RRU channel, the second component signal A2×H2×F3×Q1×G1×J1 corresponding to the second calibration signal A2 on the end that is input from the second RRU channel, and the third component signal A3×H3×F5×Q3×G2×J1 corresponding to the third calibration signal A3 on the end that is input from the separate RRU channel. It can be learned that, the first component signal A1×H1×F1×Q1×G1×J1 is the product of the first calibration signal A1, the frequency response H1×F1×Q1 of the first RRU channel, the first transmission frequency response G1, and the third transmission frequency response J1, the second component signal A2×H2×F3×Q1×G1×J1 is the product of the second calibration signal A2, the frequency response H2×F3×Q1 of the second RRU channel, the first transmission frequency response G1, and the third transmission frequency response J1, and the third component signal A3×H3×F5×Q3×G2×J1 is the product of the third calibration signal A3, the frequency response H3×F5×Q3 of the separate RRU channel, the second transmission frequency response G2, and the third transmission frequency response J1.

Further, in a process of comparing the first component signal with the first calibration signal, the comparison subunit 3015 may perform an operation on the first component signal A1×H1×F1×Q1×G1×J1 and the first calibration signal A1 (for example, divide the first component signal A1×H1×F1×Q1×G1×J1 by the first calibration signal A1), to obtain a product of the frequency response H1×F1×Q1 of the first RRU channel, the first transmission frequency response G1, and the third transmission frequency response J1 and use the product as the first frequency response, that is, the first frequency response is H1×F1×Q1×G1×J1. In a process of comparing the second component signal with the second calibration signal, the comparison subunit 3015 may perform an operation on the second component signal A2×H2×F3×Q1×G1×J1 and the second calibration signal A2 (for example, divide the second component signal A2×H2×F3×Q1×G1×J1 by the second calibration signal A2), to obtain a product of the frequency response H2×F3×Q1 of the second RRU channel, the first transmission frequency response G1, and the third transmission frequency response J1 and use the product as the second frequency response, that is, the second frequency response is H2×F3×Q1×G1×J1. In a process of comparing the third component signal with the third calibration signal, the comparison subunit 3015 may perform an operation on the third component signal A3×H3×F5×Q3×G2×J1 and the third calibration signal A3 (for example, divide the third component signal A3×H3×F5×Q3×G2×J1 by the third calibration signal A3), to obtain a product of the frequency response H3×F5×Q3 of the separate RRU channel, the second transmission frequency response G2, and the third transmission frequency response J1 and use the product as the third frequency response, that is, the third frequency response is H3×F5×Q3×G2×J1.

Further, the obtaining subunit 3016 may obtain the difference (H1×F1×Q1×G1)/(H3×F5×Q3×G2) between the first frequency response H1×F1×Q1×G1×J1 and the third frequency response H3×F5×Q3×G2×J1 and use the difference as the frequency response difference between the first RRU channel and the separate RRU channel, and may obtain the difference (H2×F3×Q1×G1)/(H3×F5×Q3×G2) between the second frequency response H2×F3×Q1×G1×J1 and the third frequency response H3×F5×Q3×G2×J1 and use the difference as the frequency response difference between the second RRU channel and the separate RRU channel.

Further, in a process of obtaining the frequency response difference between the first RRU channel and the second RRU channel according to the frequency response difference between the first RRU channel and the separate RRU channel and the frequency response difference between the second RRU channel and the separate RRU channel, the second obtaining unit 302 may divide the frequency response difference (H1×F1×Q1×G1)/(H3×F5×Q3×G2) between the first RRU channel and the separate RRU channel by the frequency response difference (H2×F3×Q1×G1)/(H3×F5×Q3×G2) between the second RRU channel and the separate RRU channel to obtain the frequency response difference between the first RRU channel and the second RRU channel, that is, (H1×F1×Q1)/(H2×F3×Q1).

In this embodiment of the present invention, the foregoing system described in FIG. 4 may further include a selection switch unit, configured to select any one of multiple combined signals and provide the signal for the collection subunit 3014. This is not limited in this embodiment of the present invention.

In this embodiment of the present invention, by implementing the foregoing systems described in FIG. 3 and FIG. 4, a frequency response difference between any two interconnected RRU channels in the RRU channel network architecture shown in FIG. 1 can be accurately obtained.

In this embodiment of the present invention, the foregoing units or subunits may be combined, divided, and deleted according to an actual need.

Figure 5:
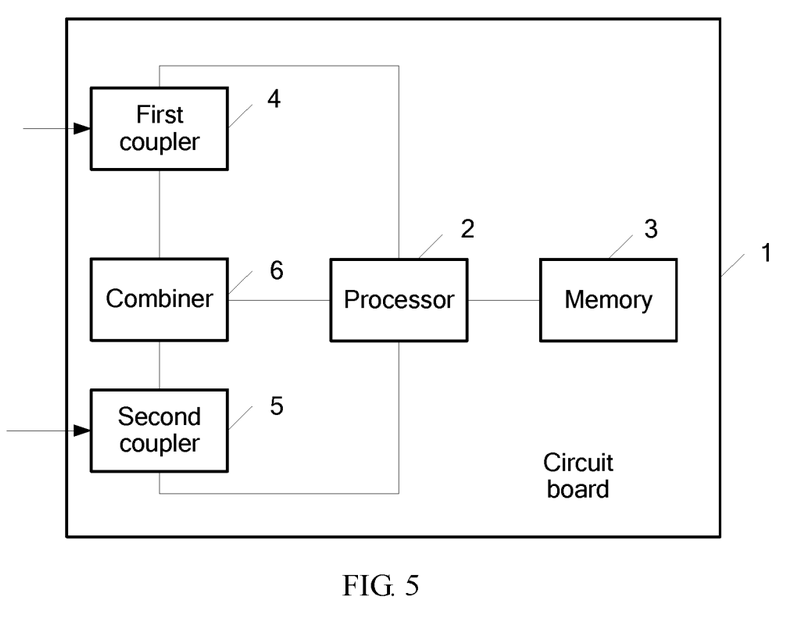
FIG. 5 is a schematic structural diagram of a base station device disclosed in an embodiment of the present invention.

Referring to FIG. 5, FIG. 5 is a schematic structural diagram of a base station device disclosed in an embodiment of the present invention. The base station device described in FIG. 5 may be a separate device or board, or may be a part newly added to an RRU. This is not limited in this embodiment of the present invention. The base station device shown in FIG. 5 may be applied to a scenario in which multiple RRU channel groups are obtained by means of division between a BBU and an RRU and all RRU channels in each RRU channel group are interconnected by using a same bridge. As shown in FIG. 5, the base station device may include a circuit board 1, a processor 2, and a memory 3. The processor 2 and the memory 3 are carried on the circuit board 1, and the processor 2 is configured to invoke program code stored in the memory 3, to perform the following operations:

separately obtaining, for a first RRU channel and a second RRU channel that are interconnected in any RRU channel group, a frequency response difference between the first RRU channel and a separate RRU channel and a frequency response difference between the second RRU channel and the separate RRU channel, where the separate RRU channel does not pass through a bridge through which both the first RRU channel and the second RRU channel pass; and obtaining a frequency response difference between the first RRU channel and the second RRU channel according to the frequency response difference between the first RRU channel and the separate RRU channel and the frequency response difference between the second RRU channel and the separate RRU channel.

In some embodiments, the base station device shown in FIG. 5 further includes a first coupler 4, a second coupler 5, and a combiner 6 that are carried on the circuit board 1. The first coupler 4 and the second coupler 5 are separately electrically connected to the combiner 6, and the combiner 6 is electrically connected to the processor 2. A manner in which the processor 2 separately obtains, for the first RRU channel and the second RRU channel that are interconnected in the any RRU channel group, the frequency response difference between the first RRU channel and the separate RRU channel and the frequency response difference between the second RRU channel and the separate RRU channel may be:

the processor 2 triggers, for the first RRU channel and the second RRU channel that are interconnected in the any RRU channel group, the first coupler 4 to perform signal coupling on ends of the first RRU channel and the second RRU channel, to obtain a first coupling signal and transmit the first coupling signal to the combiner 6; and triggers the second coupler 5 to perform signal coupling on an end of the separate RRU channel, to obtain a second coupling signal and transmit the second coupling signal to the combiner 6; and the combiner 6 combines the first coupling signal and the second coupling signal, to obtain a combined signal and transmit the combined signal to the processor 2;

the processor 2 collects the combined signal to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end, where the first calibration signal, the second calibration signal, and the third calibration signal are known calibration signals that are pairwise orthogonal;

the processor 2 compares the first component signal with the first calibration signal to obtain a first frequency response, compares the second component signal with the second calibration signal to obtain a second frequency response, and compares the third component signal with the third calibration signal to obtain a third frequency response; and the processor 2 obtains a difference between the first frequency response and the third frequency response and uses the difference as the frequency response difference between the first RRU channel and the separate RRU channel, and obtains a difference between the second frequency response and the third frequency response and uses the difference as the frequency response difference between the second RRU channel and the separate RRU channel.

In some embodiments, a manner in which the combiner 6 combines the first coupling signal and the second coupling signal to obtain the combined signal is specifically:

the combiner 6 processes the first coupling signal by using a first transmission frequency response of the first coupling signal, the combiner 6 processes the second coupling signal by using a second transmission frequency response of the second coupling signal, and the combiner 6 combines the processed first coupling signal and the processed second coupling signal to obtain the combined signal.

In some embodiments, a manner in which the processor 2 collects the combined signal to obtain the first component signal that is of the first calibration signal input from the first RRU channel and that is output from the end, the second component signal that is of the second calibration signal input from the second RRU channel and that is output from the end, and the third component signal that is of the third calibration signal input from the separate RRU channel and that is output from the end is specifically:

the processor 2 processes the combined signal by using a third transmission frequency response of the combined signal; and the processor 2 collects the processed combined signal to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel, where the first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

In some embodiments, a manner in which the processor 2 compares the first component signal with the first calibration signal to obtain the first frequency response is specifically:

dividing the first component signal by the first calibration signal to obtain a product of the frequency response of the first RRU channel, the first transmission frequency response, and the third transmission frequency response, and using the product as the first frequency response;

a manner in which the processor 2 compares the second component signal with the second calibration signal to obtain the second frequency response is specifically:

dividing the second component signal by the second calibration signal to obtain a product of the frequency response of the second RRU channel, the first transmission frequency response, and the third transmission frequency response, and using the product as the second frequency response;

a manner in which the processor 2 compares the third component signal with the third calibration signal to obtain the third frequency response is specifically:

dividing, by the processor 2, the third component signal by the third calibration signal to obtain a product of the frequency response of the separate RRU channel, the second transmission frequency response, and the third transmission frequency response, and using the product as the third frequency response; and that the processor 2 obtains a frequency response difference between the first RRU channel and the second RRU channel according to the frequency response difference between the first RRU channel and the separate RRU channel and the frequency response difference between the second RRU channel and the separate RRU channel includes:

the processor 2 divides the frequency response difference between the first RRU channel and the separate RRU channel by the frequency response difference between the second RRU channel and the separate RRU channel, to obtain the frequency response difference between the first RRU channel and the second RRU channel.

In this embodiment of the present invention, the foregoing first and second are only used to indicate two different RRU channels, but not to sort the RRU channels. The foregoing first transmission frequency response may be used to intuitively evaluate a capability of reproducing the first coupling signal by the system and a noise filtering feature of the system, the second transmission frequency response may be used to intuitively evaluate a capability of reproducing the second coupling signal by the system and a noise filtering feature of the system, and the third transmission frequency response may be used to intuitively evaluate a capability of reproducing the combined signal by the system and a noise filtering feature of the system.

In this embodiment of the present invention, by implementing the foregoing system described in FIG. 5, a frequency response difference between any two interconnected RRU channels in the RRU channel network architecture shown in FIG. 1 can be accurately obtained.

Persons of ordinary skill in the art may understand that, all or a part of the steps in each method of the foregoing embodiments may be implemented by a program instructing related hardware. The program may be stored in a computer readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory, (EEPROM), a compact disc read-only memory (CD-ROM), or another optical disk memory, magnetic disk memory, magnetic tape memory, or any other computer readable medium that can be configured to carry or store data.

The RRU channel frequency response difference obtaining method and system and the base station device disclosed in the embodiments of the present application are described in detail above. The principles and implementations of the present invention are described in this specification by using specific examples. The description of the foregoing embodiments is merely intended to help understand the method and core ideas of the present application. In addition, persons of ordinary skill in the art may make modifications with respect to the specific implementations and application scopes according to the ideas of the present disclosure. Therefore, the content of this specification herein shall not be construed as a limitation on the present disclosure.

What is claimed is:

1. An RRU channel frequency response difference obtaining method, wherein multiple RRU channel groups are obtained by a division between a BBU and an RRU, all RRU channels in each RRU channel group are interconnected by using a same bridge, and the method comprises:

separately obtaining, for a first RRU channel and a second RRU channel that are interconnected in any of the RRU channel group, a frequency response difference between the first RRU channel and a separate RRU channel, and a frequency response difference between the second RRU channel and the separate RRU channel, wherein the separate RRU channel is not in the any of the RRU channel group; and obtaining a frequency response difference between the first RRU channel and the second RRU channel according to the frequency response difference between the first RRU channel and the separate RRU channel and the frequency response difference between the second RRU channel and the separate RRU channel.

2. The method according to claim 1, wherein separately obtaining, for a first RRU channel and a second RRU channel that are interconnected in any of the RRU channel group, a frequency response difference between the first RRU channel and a separate RRU channel, and a frequency response difference between the second RRU channel and the separate RRU channel comprises:

performing signal coupling on ends of the first RRU channel and the second RRU channel for the first RRU channel and the second RRU channel that are interconnected in the any of the RRU channel group, to obtain a first coupling signal, and performing signal coupling on an end of the separate RRU channel, to obtain a second coupling signal;

combining the first coupling signal and the second coupling signal to obtain a combined signal;

collecting the combined signal to obtain a first component signal of a first calibration signal input from the first RRU channel and output from the end, a second component signal of a second calibration signal input from the second RRU channel and output from the end, and a third component signal of a third calibration signal input from the separate RRU channel and output from the end, wherein the first calibration signal, the second calibration signal, and the third calibration signal are known calibration signals that are pairwise orthogonal or unrelated;

comparing the first component signal with the first calibration signal to obtain a first frequency response, comparing the second component signal with the second calibration signal to obtain a second frequency response, and comparing the third component signal with the third calibration signal to obtain a third frequency response;

obtaining a difference between the first frequency response and the third frequency response, and using the difference as the frequency response difference between the first RRU channel and the separate RRU channel; and obtaining a difference between the second frequency response and the third frequency response, and using the difference as the frequency response difference between the second RRU channel and the separate RRU channel.

3. The method according to claim 2, wherein combining the first coupling signal and the second coupling signal to obtain a combined signal comprises:

processing the first coupling signal by using a first transmission frequency response of the first coupling signal, and processing the second coupling signal by using a second transmission frequency response of the second coupling signal; and combining the processed first coupling signal and the processed second coupling signal to obtain the combined signal.

4. The method according to claim 3, wherein collecting the combined signal to obtain a first component signal that is of a first calibration signal input from the first RRU channel and that is output from the end, a second component signal that is of a second calibration signal input from the second RRU channel and that is output from the end, and a third component signal that is of a third calibration signal input from the separate RRU channel and that is output from the end comprises:

processing the combined signal by using a third transmission frequency response of the combined signal; and collecting the processed combined signal to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel, wherein the first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

5. The method according to claim 4, wherein comparing the first component signal with the first calibration signal to obtain a first frequency response comprises:

dividing the first component signal by the first calibration signal to obtain a product of the frequency response of the first RRU channel, the first transmission frequency response, and the third transmission frequency response, and using the product as the first frequency response; and, wherein comparing the second component signal with the second calibration signal to obtain a second frequency response comprises:

dividing the second component signal by the second calibration signal to obtain a product of the frequency response of the second RRU channel, the first transmission frequency response, and the third transmission frequency response, and using the product as the second frequency response;

comparing the third component signal with the third calibration signal to obtain a third frequency response comprises:

dividing the third component signal by the third calibration signal to obtain a product of the frequency response of the separate RRU channel, the second transmission frequency response, and the third transmission frequency response, and using the product as the third frequency response; and obtaining a frequency response difference between the first RRU channel and the second RRU channel according to the frequency response difference between the first RRU channel and the separate RRU channel and the frequency response difference between the second RRU channel and the separate RRU channel comprises:

dividing the frequency response difference between the first RRU channel and the separate RRU channel by the frequency response difference between the second RRU channel and the separate RRU channel, to obtain the frequency response difference between the first RRU channel and the second RRU channel.

6. A base station device, wherein multiple RRU channel groups are obtained by means of division between a BBU and an RRU, all RRU channels in each RRU channel group are interconnected by using a same bridge, and the base station device comprises a circuit board, a processor, and a memory, wherein the processor and the memory are carried on the circuit board, and the processor is configured to invoke program code stored in the memory, to perform:

separately obtaining, for a first RRU channel and a second RRU channel that are interconnected in any of the RRU channel group, a frequency response difference between the first RRU channel and a separate RRU channel and a frequency response difference between the second RRU channel and the separate RRU channel, wherein the separate RRU channel does not pass through a bridge through which both the first RRU channel and the second RRU channel pass; and obtaining a frequency response difference between the first RRU channel and the second RRU channel according to the frequency response difference between the first RRU channel and the separate RRU channel and the frequency response difference between the second RRU channel and the separate RRU channel.

7. The base station device according to claim 6, further comprising a first coupler, a second coupler, and a combiner that are carried on the circuit board, wherein the first coupler and the second coupler are separately electrically connected to the combiner, the combiner is electrically connected to the processor, and wherein the processor separately obtaining, for the first RRU channel and the second RRU channel that are interconnected in any of the RRU channel group, the frequency response difference between the first RRU channel and the separate RRU channel and the frequency response difference between the second RRU channel and the separate RRU channel comprises:

triggering, for the first RRU channel and the second RRU channel that are interconnected in any of the RRU channel group, the first coupler to perform signal coupling on ends of the first RRU channel and the second RRU channel, to obtain a first coupling signal and transmit the first coupling signal to the combiner; and triggering the second coupler to perform signal coupling on an end of the separate RRU channel, to obtain a second coupling signal and transmit the second coupling signal to the combiner; and, wherein the combiner is configured to combine the first coupling signal and the second coupling signal, to obtain a combined signal and transmit the combined signal to the processor;

the processor is configured to:

collect the combined signal to obtain a first component signal of a first calibration signal input from the first RRU channel and output from the end, a second component signal of a second calibration signal input from the second RRU channel and output from the end, and a third component signal of a third calibration signal input from the separate RRU channel and output from the end, wherein the first calibration signal, the second calibration signal, and the third calibration signal are known calibration signals that are pairwise orthogonal or unrelated;

compare the first component signal with the first calibration signal to obtain a first frequency response;

compare the second component signal with the second calibration signal to obtain a second frequency response;

compare the third component signal with the third calibration signal to obtain a third frequency response;

obtain a difference between the first frequency response and the third frequency response and uses the difference as the frequency response difference between the first RRU channel and the separate RRU channel; and obtain a difference between the second frequency response and the third frequency response and uses the difference as the frequency response difference between the second RRU channel and the separate RRU channel.

8. The base station device according to claim 7 wherein the combiner combining the first coupling signal and the second coupling signal to obtain the combined signal comprises:

processing the first coupling signal by using a first transmission frequency response of the first coupling signal, processing the second coupling signal by using a second transmission frequency response of the second coupling signal, and combining the processed first coupling signal and the processed second coupling signal to obtain the combined signal.

9. The base station device according to claim 8, wherein the processor collecting the combined signal to obtain the first component signal of the first calibration signal input from the first RRU channel and output from the end, the second component signal of the second calibration signal input from the second RRU channel and output from the end, and the third component signal of the third calibration signal input from the separate RRU channel and output from the end comprises:

processing the combined signal by using a third transmission frequency response of the combined signal; and collecting the processed combined signal to obtain the first component signal corresponding to the first calibration signal on the end that is input from the first RRU channel, the second component signal corresponding to the second calibration signal on the end that is input from the second RRU channel, and the third component signal corresponding to the third calibration signal on the end that is input from the separate RRU channel, wherein the first component signal is a product of the first calibration signal, a frequency response of the first RRU channel, the first transmission frequency response, and the third transmission frequency response, the second component signal is a product of the second calibration signal, a frequency response of the second RRU channel, the first transmission frequency response, and the third transmission frequency response, and the third component signal is a product of the third calibration signal, a frequency response of the separate RRU channel, the second transmission frequency response, and the third transmission frequency response.

10. The base station device according to claim 9, wherein the processor comparing the first component signal with the first calibration signal to obtain the first frequency response comprises:

dividing the first component signal by the first calibration signal to obtain a product of the frequency response of the first RRU channel, the first transmission frequency response, and the third transmission frequency response, and using the product as the first frequency response;

the processor comparing the second component signal with the second calibration signal to obtain the second frequency response comprises:

dividing the second component signal by the second calibration signal to obtain a product of the frequency response of the second RRU channel, the first transmission frequency response, and the third transmission frequency response, and using the product as the second frequency response;

the processor comparing the third component signal with the third calibration signal to obtain the third frequency response comprises:

dividing, by the processor, the third component signal by the third calibration signal to obtain a product of the frequency response of the separate RRU channel, the second transmission frequency response, and the third transmission frequency response, and using the product as the third frequency response; and the processor obtaining a frequency response difference between the first RRU channel and the second RRU channel according to the frequency response difference between the first RRU channel and the separate RRU channel and the frequency response difference between the second RRU channel and the separate RRU channel comprises:

dividing the frequency response difference between the first RRU channel and the separate RRU channel by the frequency response difference between the second RRU channel and the separate RRU channel, to obtain the frequency response difference between the first RRU channel and the second RRU channel.

* * * * *